US005490775A

United States Patent [19]
Joshi et al.

[11] Patent Number: 5,490,775
[45] Date of Patent: Feb. 13, 1996

[54] FORWARD INJECTION OXY-FUEL BURNER

[75] Inventors: Mahendra L. Joshi, Altamonte Springs; Lee Broadway, Eustis, both of Fla.

[73] Assignee: Combustion Tec, Inc., Apopka, Fla.

[21] Appl. No.: 149,033

[22] Filed: Nov. 8, 1993

[51] Int. Cl.[6] .................................................. F23C 7/00
[52] U.S. Cl. ............................................................ 431/187
[58] Field of Search .................................... 431/187, 183, 431/181, 182, 8, 9

[56] References Cited

U.S. PATENT DOCUMENTS

| | | |
|---|---|---|
| 2,360,548 | 10/1944 | Conway . |
| 4,130,389 | 12/1978 | Kaburagi et al. ................ 431/183 |
| 4,439,137 | 3/1984 | Suzuki et al. . |
| 4,473,350 | 9/1984 | Gitman . |
| 4,515,553 | 5/1985 | Morimoto et al. . |
| 4,541,796 | 9/1985 | Anderson . |
| 4,690,635 | 9/1987 | Coppin . |
| 4,717,334 | 1/1988 | Newman . |
| 4,797,087 | 1/1989 | Gitman . |
| 5,195,884 | 3/1993 | Schwartz et al. ............... 431/8 |
| 5,199,866 | 4/1993 | Joshi et al. . |
| 5,209,656 | 5/1993 | Kobayashi et al. . |
| 5,266,025 | 11/1993 | Francis, Jr. et al. ............ 431/187 |
| 5,295,816 | 3/1994 | Kobayashi et al. ............. 431/9 |

*Primary Examiner*—Denise L. Gromada
*Assistant Examiner*—Susanne C. Tinker
*Attorney, Agent, or Firm*—Speckman, Pauley & Fejer

[57] ABSTRACT

A burner for combustion of a fuel/oxidant mixture mountable on a burner block having a hot face, a cold face opposite the hot face and forming a communication having a circular cross-section between the hot face and the cold face, comprising an oxidant conduit and a fuel conduit disposed concentrically within the oxidant conduit and forming an annulus between the fuel conduit and the oxidant conduit. One end of the fuel conduit extends into the burner block communication and is disposed at a distance from the burner block hot face.

4 Claims, 4 Drawing Sheets

FORWARD INJECTION OXY-FUEL BURNER

BACKGROUND THE INVENTION

1. Field of the Invention

This invention relates to a process and apparatus for combustion of a mixture of fuel and oxidant, said oxidant preferably being 100% oxygen, suitable for use in high temperature furnaces, such as glass melters.

2. Description of the Prior Art

In order to meet the requirements for use in high temperature furnaces, such as glass melters, an oxygen/fuel burner must be efficient, cost-effective, and maintenance-free, all the while producing low pollutant emissions. Use of a burner system for oxygen/fuel combustion which is not suitable for use in high temperature furnaces can result in excessive flame temperatures or improper flame shapes within the furnace, leading to furnace refractory and burner damage, and high emissions of $NO_x$, $SO_x$, particulates and batch volatiles, often exceeding the maximum levels permitted by government regulations. In addition, the cost of operation of such high temperature furnaces can be dramatically effected by burner firing performance, firing interruptions, burner influence on product quality, burner system maintenance and service requirements, and finally on the cost of the burner system itself.

In traditional oxy-fuel burners, the design of the burner nozzle configuration, including flow velocities of both oxygen and fuel, orifice size, geometry and distance between fuel and oxygen streams, turbulence considerations, aerodynamic shaping at flow exits, and selection of appropriate nozzle materials, is carefully considered to yield combustion process and flame characteristics necessary for heating the furnace interior. An example of such a device and process are taught by U.S. Pat. No. 5,199,866 which teaches an oxy-fuel system including a self-cooled adjustable oxy-fuel burner which produces a luminous flame having a concentric, fuel-rich phase and an outer surrounding oxidizer-rich phase and where the flame generated by the system is directed through a burner block (pre-combustor) mounted on the flame end of the burner, the burner block having a length-to-diameter ratio fixed by the firing rate of the burner. Similarly, U.S. Pat. No. 4,690,635 teaches a high temperature burner having a fuel nozzle disposed within an oxygen conduit and disposed external to a burner block to which it is secured. Gaseous fuel flows through the nozzle and mixes with the oxygen from the oxygen conduit to form a sustainable flame substantially within the refractory burner block.

U.S. Pat. No. 2,360,548 teaches a method and burner for combustion of a hydrocarbon fuel such as natural gas to produce a luminous flame consisting of a central fuel nozzle disposed within an air duct which, in turn, is disposed within a burner block. Air from the air duct flows around the fuel nozzle and mixes with the fuel in the burner block. The end of the fuel nozzle is enlarged to form a venturi between the fuel nozzle and the air duct in order to increase the velocity of the air flowing into the burner block.

U.S. Pat. No. 4,439,137 teaches a method and apparatus for combustion in which air is injected into a furnace through a burner tile in a deviated flow pattern asymmetrical with respect to the burner tile and mixed with fuel introduced into the burner tile through a nozzle disposed in the burner tile. A second portion of air is introduced into the combustion chamber downstream of the burner for completion of the combustion process. Contrary to this invention, the burner disclosed by the '137 Patent is designed to prevent the formation of soot.

U.S. Pat. No. 5,209,656 teaches a combustion system for high velocity gas injection in which a fuel or oxidant is injected at high velocity through a nozzle recessed in a burner block and a purge gas having the same composition as the gas injected through the nozzle is injected at a low velocity through the burner block and around the nozzle into a combustion chamber in a defined relationship such that the low velocity gas forms a protective barrier to combustion zone damage due to the flow dynamics caused by the high velocity gas.

U.S. Pat. No. 4,541,796 teaches a process and apparatus for firing a furnace using oxygen or oxygen-enriched air in which the oxygen or oxygen-enriched air is injected into the furnace through a plurality of jets surrounding a central fuel jet at a velocity sufficient to cause aspiration of furnace gases into the oxygen or oxygen-enriched air jets before they mix with the fuel jet. The fuel nozzle of the disclosed burner extends through the combustion chamber wall and is flush with the inside of the combustion chamber wall.

U.S. Pat. Nos. 4,717,334, 4,797,087, and 4,515,553 generally teach burners in which the fuel nozzle is disposed external to the burner block to which the burner is secured. U.S. Pat. No. 4,473,350 teaches an oxy-fuel burner having a combustion chamber recessed into a graphite burner block where the fuel is supplied to the walls of the combustion chamber for film cooling and where the burner block includes a plurality of parallel cooling bores arranged in an array about the combustion chamber so as to reduce the temperature of the burner block and the combustion chamber.

Crucial to the performance of an oxy-fuel burner in high temperature furnaces are flow velocities, firing rates and burner block design. Improper selection of flow velocities, firing rates and/or burner block cavity design can lead to a high temperature flame within the burner block and vicinity of the oxy-fuel burner nozzles and, thus, generally leads to deterioration/oxidation of burner nozzles; damage to burner block refractory material which can affect the normal flame direction within the burner block cavity; undesirable heating of furnace walls, not only affecting the life expectancy of such walls, but also effecting an increase in heat loss to the areas surrounding the furnace; non-luminous and short flame coupled with non-uniform heat distribution to the load; decreased productivity and poor product quality; and lower burner nozzle and burner block life, as well as increased maintenance.

SUMMARY OF THE INVENTION

It is an object of this invention to provide an oxy-fuel burner suitable for use in high temperature furnaces which is efficient, cost effective, virtually maintenance free, and which is low pollutant emission generating.

It is an object of this invention to provide an oxy-fuel burner having flow velocities, firing rates, and a burner block cavity design which prevents the generation of a high temperature flame within the burner block and vicinity of the oxy-fuel burner nozzles, thereby reducing deterioration and/or oxidation of the burner nozzles and reducing damage to the burner block refractory material, thereby increasing burner nozzle and burner block life.

It is yet another object of this invention to provide an oxy-fuel burner suitable for use in high temperature furnaces which prevents undesirable heating of furnace walls and, thus, provides better control of heat loss through the furnace walls to the surroundings.

It is another object of this invention to provide an oxy-fuel burner which produces a highly luminous flame and which provides uniform heat distribution to the load being heated.

It is yet another object of this invention to provide an oxy-fuel burner for high temperature furnaces which has the potential of providing increased productivity and improved product quality.

These and other objects are achieved by a burner for combustion of a mixture of fuel and an oxidant in accordance with one embodiment of this invention which is mountable on a burner block having a hot face, a cold face opposite the hot face and a communication formed by said burner block between said hot face and said cold face, said communication having a generally circular cross-section. As used throughout the specification and claims, the term oxidant is meant to encompass compositions of gas having an oxygen concentration in the range of about 75% to 100%. The burner comprises an oxidant conduit and a fuel conduit disposed concentrically within the oxidant conduit, forming an annulus between said fuel conduit and said oxidant conduit. One end of the fuel conduit extends into the burner block communication, said end maintained at a distance from the hot face of the burner block, whereby the ratio of the distance between said end of the fuel conduit and the burner block hot face to the diameter of the burner block communication is between about 0.5:1 to about 2.0:1.

The process for combustion of a fuel and oxidant mixture in accordance with one embodiment of this invention comprises introducing the fuel into the communication in the burner block between the hot and cold faces thereof through a fuel conduit disposed concentrically within an oxidant conduit and having one end disposed within the communication. The oxidant, preferably oxygen or oxygen-enriched air, is introduced into the communication through an annulus formed between the fuel conduit and the oxidant conduit. The fuel within the burner block communication is partially cracked to form cracked products comprising soot. The resulting cracked products and the remaining fuel are burned in a furnace, forming a luminous flame.

BRIEF DESCRIPTION OF THE DRAWINGS

These and other features and objects of this invention will be better understood from the following detailed description taken in conjunction with the drawings wherein.

DESCRIPTION OF PREFERRED EMBODIMENTS

Figure 1:
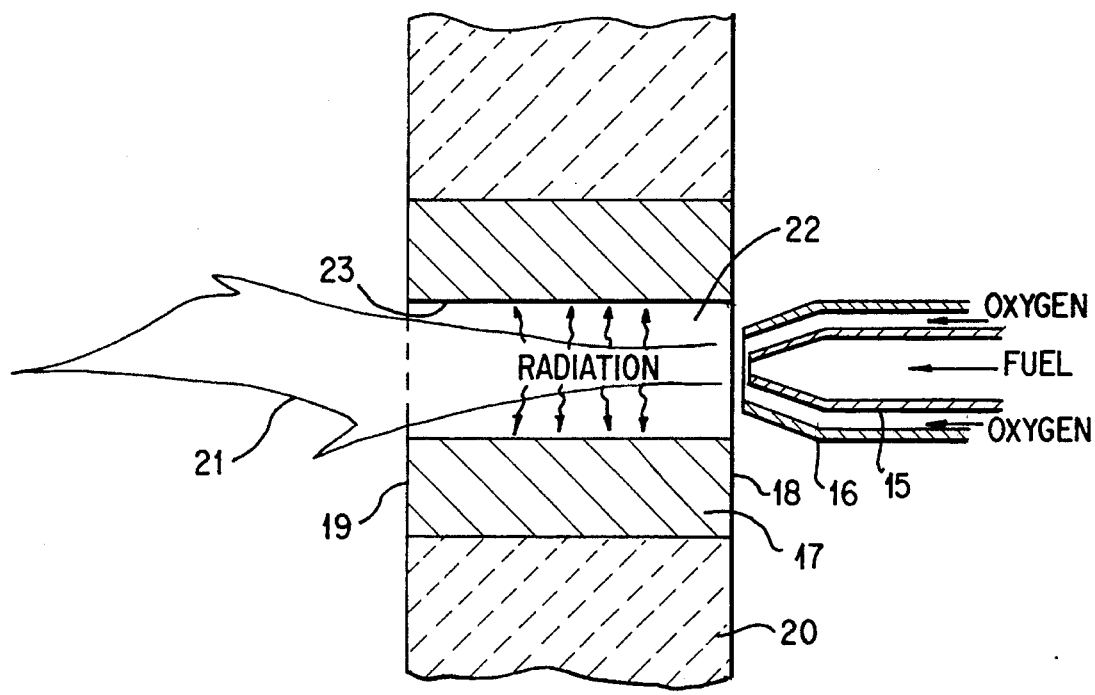
FIG. 1 is a schematic diagram in cross-section of a known burner configuration for an oxy-fuel burner.

FIG. 1 is a schematic diagram of a known burner nozzle configuration in accordance with known oxy-fuel burners in which fuel conduit or nozzle 15 is disposed within oxygen conduit or nozzle 16, the ends of which are flush with cold face 18 of burner block 17 disposed in furnace wall 20. As shown in FIG. 1, the initial development of flame 21 occurs within burner block communication 22 due to the disposition of the outlets of fuel nozzle 15 and oxygen nozzle 16 flush with burner block cold face 18. One significant disadvantage of this known burner configuration is the increase in peak temperature of burner block wall 23 which forms communication 22 due to radiation of heat from flame 21 to burner block wall 23 as shown by the arrows in FIG. 1. This, in turn, can lead to damage to burner block refractory material, which sometimes melts and obstructs the normal flame direction inside burner block communication 22 and, thus, affects the flame quality in terms of location within the furnace which can produce undesirable heating of furnace walls as well as non-uniform heat distribution to the load.

Figure 2:
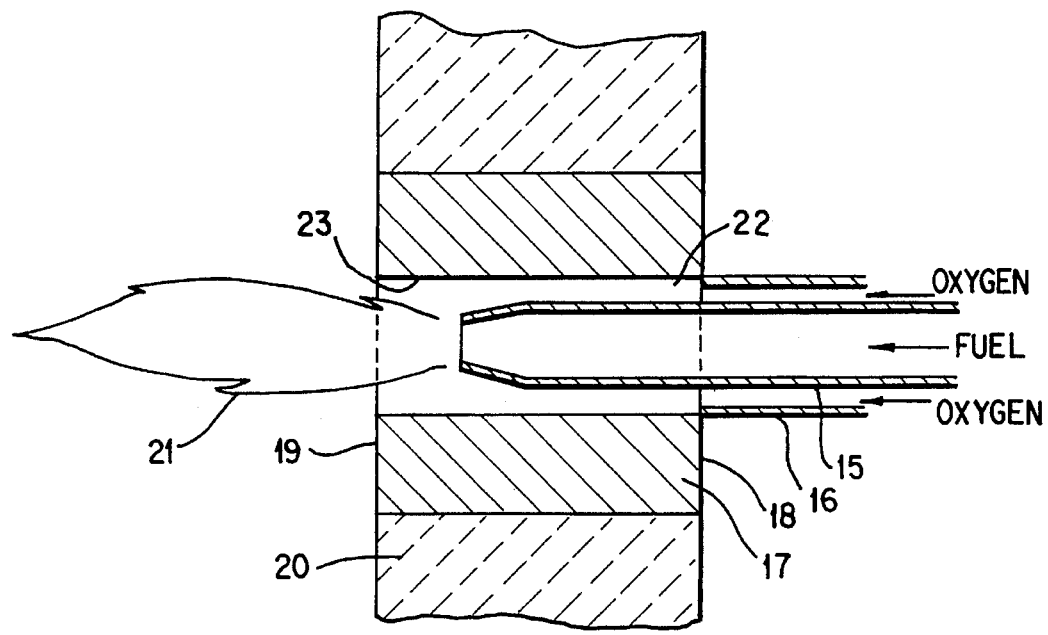
FIG. 2 is a schematic diagram in cross-section of a burner nozzle configuration of an oxy-fuel burner in accordance with one embodiment of this invention.

FIG. 2 shows a schematic diagram of a forward injection oxy-fuel burner in accordance with one embodiment of this invention comprising fuel conduit 15 disposed concentrically within oxidant conduit 16 forming an annulus between said fuel conduit 15 and said oxidant conduit 16. One end of fuel conduit 15 extends into communication 22 of burner block 17, communication 22 extending between cold face 18 and hot face 19 of burner block 17. In accordance with this embodiment of the invention, flame 21 is formed nearly external to communication 22 of burner block 17, thereby producing a highly luminous oxy-fuel flame which imparts most its heat inside of the furnace while preventing overheating of the burner and burner block material. In addition, the choice of a forward location for fuel conduit 15 within burner block communication 22, coupled with fuel and oxidant flow parameters discussed hereinbelow, encourages partial cracking of the fuel into soot particles due to furnace radiation, which soot particles subsequently burn with oxygen and produce a highly luminous flame. The burner/burner block configuration shown in FIG. 3 offers a highly efficient, low emission, cost effective and maintenance free burner firing operation.

Figure 3:
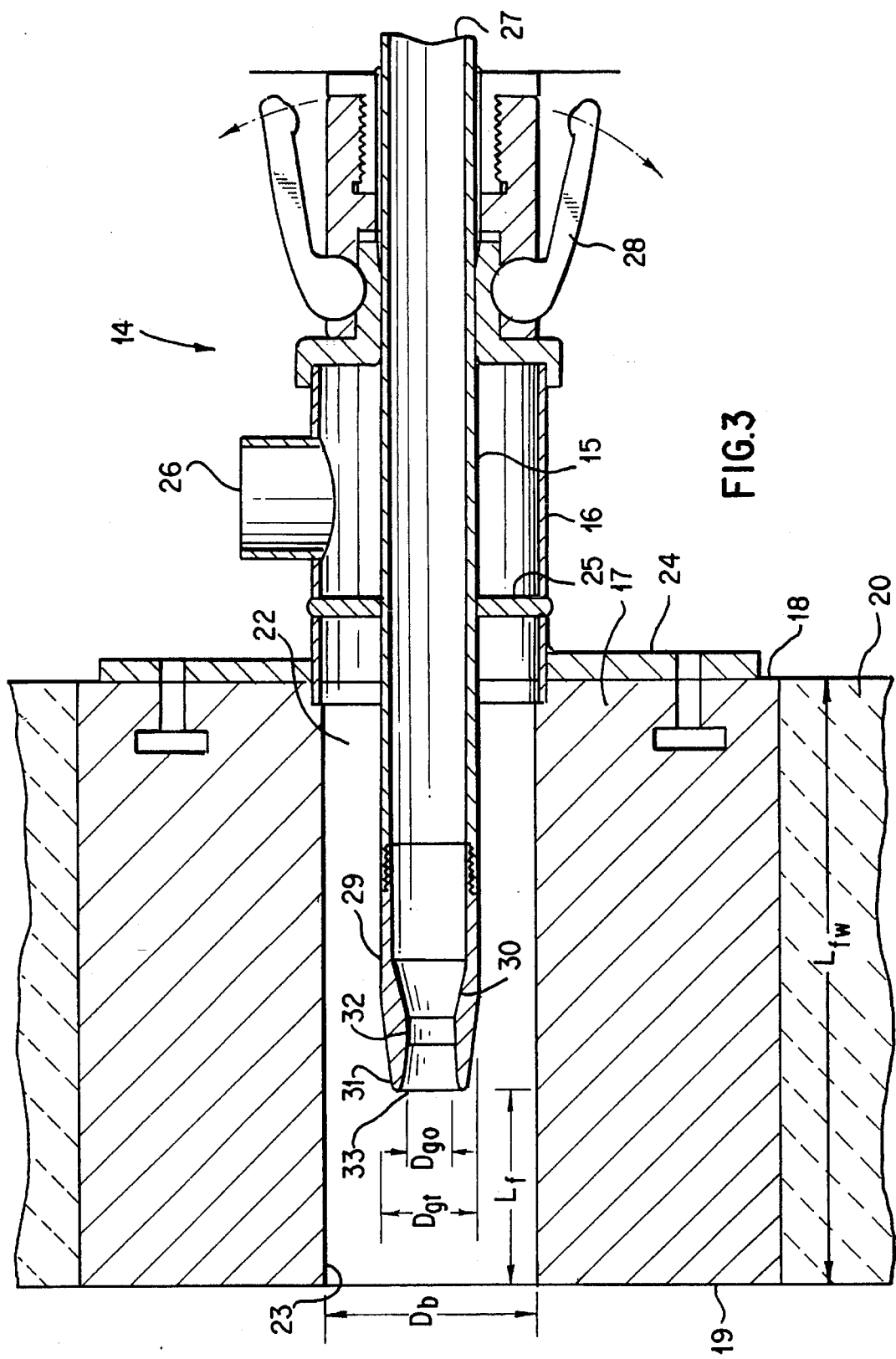
FIG. 3 is a cross-sectional view of an oxy-fuel burner in accordance with one embodiment of this invention.

FIG. 3 is a cross-sectional side view of an oxy-fuel burner mountable on a burner block in accordance with one embodiment of this invention. As shown in FIG. 3, burner 14 is mounted on cold face 18 of burner block 17 by mounting flange 24. The fuel, preferably natural gas, is introduced into fuel conduit 15 through fuel inlet 27, fuel conduit 15 being disposed in spaced relation to and concentric within oxidant conduit 16. Fuel conduit 15 is maintained concentric within oxidant conduit 16 by centering pins 25. Fuel conduit 15 comprises fuel tip 29 having internal convergence 30 followed by internal divergence 31 in the direction of burner block hot face 19 with fuel orifice 32 dispose between internal convergence 30 and internal divergence 31. In accordance with one embodiment of this invention, fuel tip 29 is integral with fuel conduit 15. In accordance with another embodiment of this invention, fuel tip 29 is a separate piece secured to the end of fuel conduit 15 disposed within burner block communication 22.

As shown in FIG. 3, oxidant is introduced into burner 14 through oxidant inlet 26. Thereafter, the oxidant flows in an annular configuration around fuel conduit 15 into burner block communication 22 where it mixes with fuel from fuel conduit 15.

As shown in FIG. 3, fuel conduit 15 is inserted into burner block 17 having burner block communication 22 with a diameter of $D_b$ and a length of $L_{fw}$ at a distance $L_f$ from burner block hot face 19. Fuel orifice 32 in fuel tip 29 has a diameter $D_{go}$ and fuel conduit 15 has an outside diameter designated as $D_{gt}$.

Burner block length $L_{fw}$ is selected, in accordance with one embodiment of this invention, to be the same as the thickness of furnace wall 20. The diameter $D_b$ of burner block communication 22, together with the outside diameter $D_{gt}$ of fuel conduit 15, are selected on the basis of oxygen flow area and velocity needed for burner block wall cooling and maintenance of overall flame shape and momentum. The diameter $D_{go}$ of fuel orifice 32 is selected to obtain fuel velocity and residence time for the fuel stream which promote partial cracking of the fuel inside the furnace interior and which enable mixing of the fuel stream with oxygen to produce a highly luminous flame.

The distance $L_f$ of fuel conduit end 33 from burner block hot face 19 is an important design parameter of the burner of this invention, which parameter is determined based on burner firing capacity to 1) take advantage of furnace interior radiation to crack or pyrolyze certain portions of the fuel and create a highly luminous flame; 2) utilize a very small fraction of burner block communication 22 for flame development, thereby maintaining a significant portion of burner block communication 22 for cooling using oxidant; 3) form a flame of desirable momentum and shape for even heat distribution inside the furnace; 4) push a significant portion of the flame having high peak temperatures outside of burner block communication 22 which would otherwise overheat the burner block material as well as the burner; and 5) permit construction of the burner and burner block out of relatively inexpensive materials due to the significant reduction in exposure of such items to radiation, thereby also increasing the life of these components and decreasing the maintenance and the service requirements.

Table 1, herein below, summarizes the design and operating parameters for a burner in accordance with one embodiment of this invention.

TABLE 1

| PARAMETER | VALUES |
| --- | --- |
| Firing rate (MM Btu/Hr) | 0.25–20 |
| ($L_f/D_b$) | 0.5–2.0 |
| ($D_{go}/D_b$) | 0.1–0.5 |
| ($D_b$) | 2"–8" |
| Combustion Oxygen Velocity (Ft./S) | <600 |
| Natural Gas Velocity (Ft./S) | <600 |

The numbers shown in Table 1 are empirical values, derived from the measurements of flame luminosity, length and shape and operating temperatures of burner and burner block materials using the burner of this invention. These parameters were determined on the basis of trends in flame luminosity and burner/burner block peak wall temperatures measured at various firing rates. For parameters falling outside of the ranges shown in Table 1, burner performance and burner/burner block operating temperatures are unsatisfactory.

Figure 4:
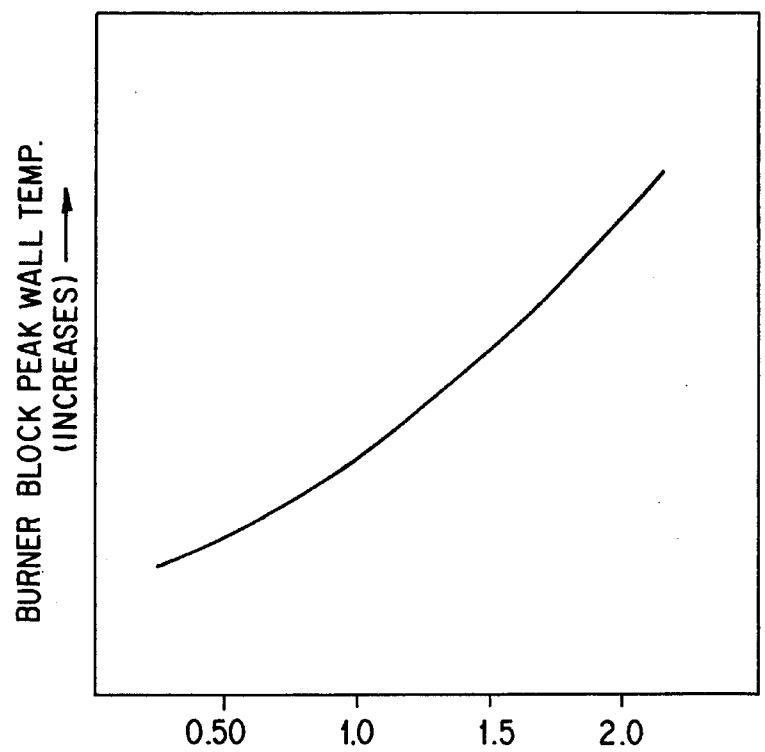
FIG. 4 is a diagram showing the effect of fuel nozzle location within a burner block on the peak wall temperature of the burner block.

The most important design parameter in accordance with one embodiment of this invention is the ratio of the distance $L_f$ between burner block hot face 19 and fuel conduit end 33 to the diameter $D_b$ of burner block communication 22. FIG. 4 shows the burner block peak wall temperature as a function of the disposition of fuel conduit end 33 within burner block communication 22. The preferred location of fuel conduit end 33 within burner block communication 22 is such that the ratio of the distance $L_f$ of fuel conduit end 33 from burner block hot face 19 to the diameter $D_b$ of burner block communication 22 is between about 0.5 and about 2.0. For locations of fuel conduit end 33 within burner block communication 22 producing $L_f/D_b$ ratios at the lower end of this range, the fuel stream, preferably natural gas, is exposed to relatively higher furnace radiation causing additional natural gas to undergo thermal cracking and transform into soot and hydrogen, constituents of natural gas. This further results in a very luminous flame. However, at ratios $L_f/D_p$ less than about 0.5, fuel conduit end 33 of burner 14 is exposed to much higher radiation which may cause fuel conduit end 33 of fuel conduit 15 to overheat and melt immediately if there is a temporarily loss in fuel flow.

In normal operation, the flow of natural gas through fuel conduit 15 acts as a cooling medium which maintains fuel tip 29 and fuel conduit 15 well below 1500° F. in a furnace operating at 2800° F.

For dispositions of fuel conduit end 33 within burner block communication 22 whereby the ratio $L_f/D_b$ is greater than 2.0, fuel conduit end 33 is disposed further into burner block communication 22, that is, further away from burner block hot face 19, generally resulting in additional oxygen/ natural gas combustion within burner block communication 22. As illustrated in FIG. 4, peak burner block wall temperature rises sharply with increases in the ratio $L_f/D_b$. We have determined that for ratios $L_f/D_b$ within the range of about 0.5 to about 2.0, burner block peak wall temperatures are within acceptable limits. For ratios $L_f/D_b$ greater than about 2.0, the reduction in flame luminosity coupled with the increase in burner block peak wall temperature produces unsatisfactory peak burner performance.

Figure 5:
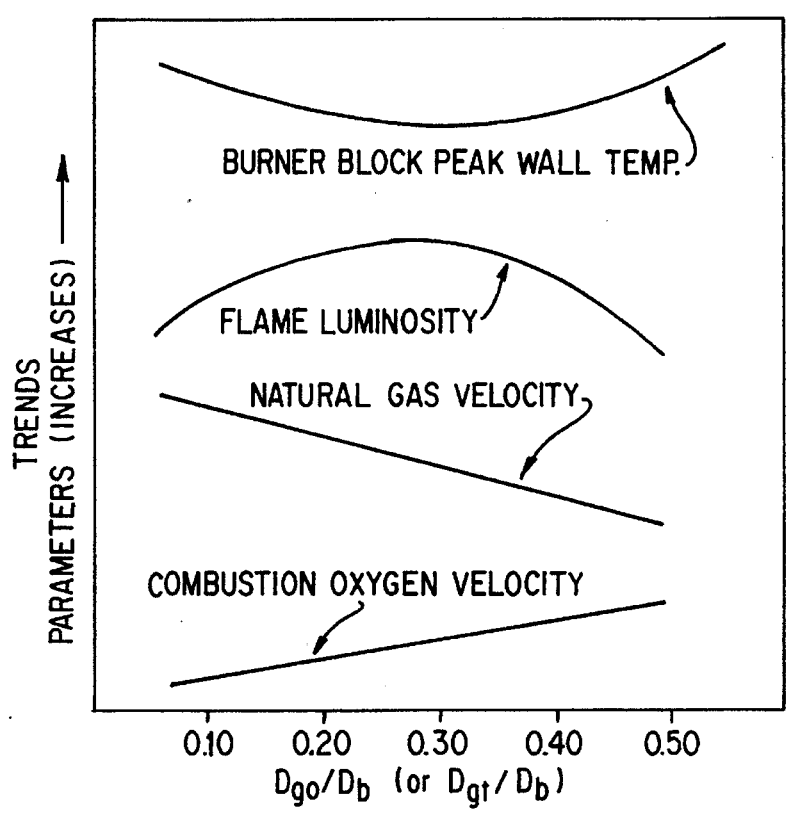
FIG. 5 is a diagram showing the effects of changes in fuel gas and combustion oxygen velocity effected by changes in the ratio of the diameter of the fuel gas orifice to the diameter of the communication through the burner block, on burner block temperature and flame luminosity.
Figure 6:
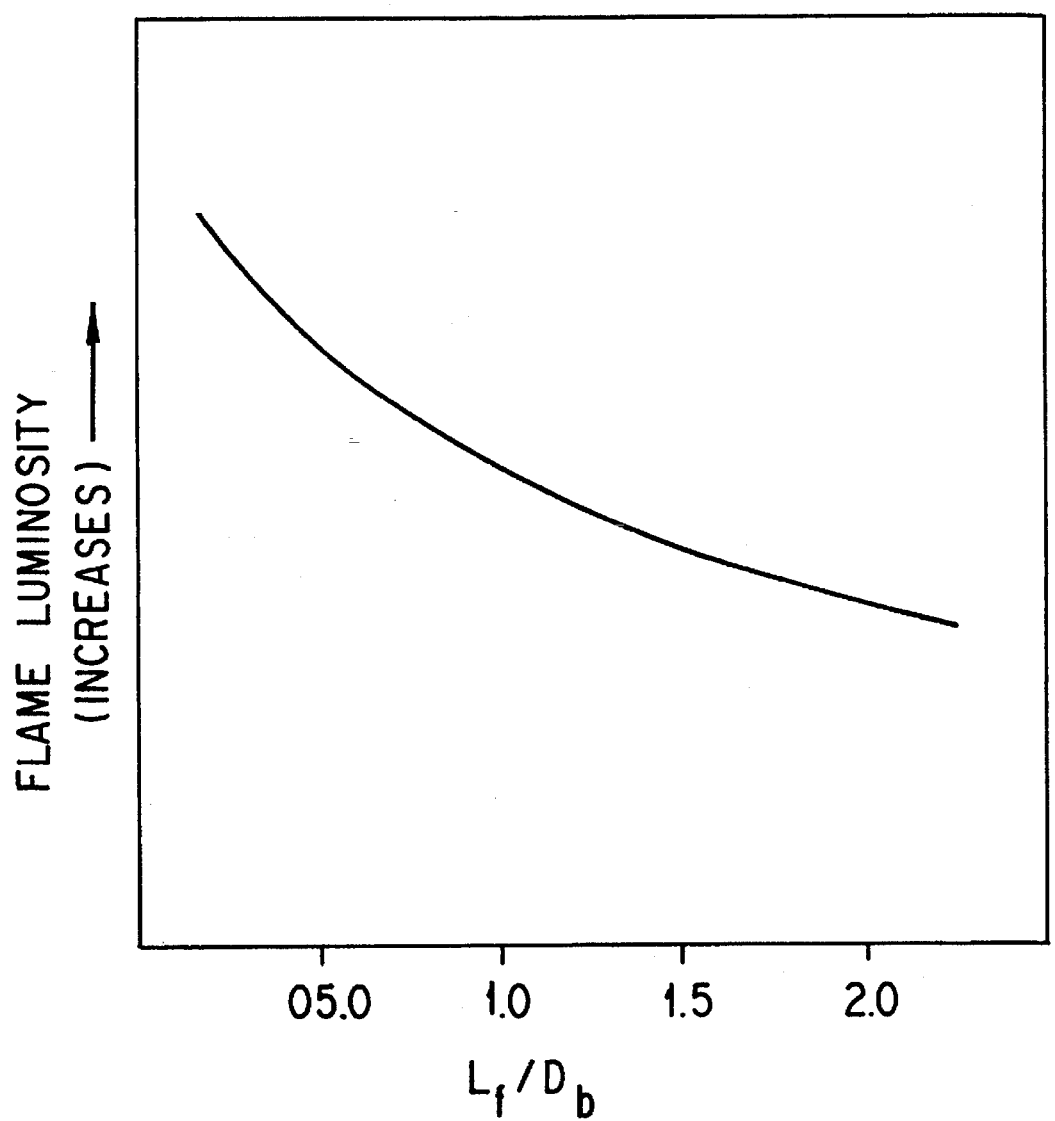
FIG. 6 shows the effect of the disposition of the fuel nozzle within the communication of the burner block on flame luminosity in accordance with one embodiment of this invention.

In accordance with a preferred embodiment of this invention, the ratio of the diameter $D_{go}$ of fuel orifice 32 to the diameter $D_b$ of burner block communication 22 is preferably between about 0.10 and about 0.5. This ratio essentially defines the fuel velocity and furnace radiation view factor for cracking some natural gas into basic constituents, that is, soot and hydrogen. FIG. 5 illustrates the effect of this ratio on various performance and burner design parameters. As shown therein, the velocity of oxidant coming out of the annulus formed between fuel conduit 15 and oxidant conduit 16 increases with increases in the ratio of the outside diameter $D_{gt}$ of fuel conduit 15 to the diameter $D_b$ of burner block communication 22 due to the reduction of annular flow area for the oxidant. On the other hand, with increases in the ratio of the diameter $D_{go}$ of fuel orifice 32 to the diameter $D_b$ of burner block communication 22, the fuel velocity deceases due to the increase in the diameter $D_{go}$ of fuel orifice 32 with respect to the diameter $D_b$ of burner block communication 22. For minimal tubular mixing between the oxidant and fuel streams within burner block communication 22, the flow velocities are required to be less than 600 feet per second. We have observed during test firing that by lowering both velocities, the mixing between fuel and oxidant streams is minimized while the radiative cracking of natural gas is maximized at an optimum of the ratio $D_{go}/D_b$. This is indicated by a trend in flame luminosity as shown in FIG. 5 which is lower at a lower value of the ratio $D_{go}/D_b$ due to increased mixing promoted by higher fuel velocities. On the other hand, luminosity is reduced at higher ratios $D_{go}/D_b$ because, at this point, the increase in oxidant velocity accelerates the combustion process within burner block communication 22 resulting in less radiative cracking of natural gas. The burner block peak wall temperature follows an opposite trend compared to luminosity because, at lower ratios $D_{go}/D_b$, the lower oxidant velocity reduces the wall cooling effect while at higher ratios $D_{go}/D_b$, the higher oxidant velocity accelerates combustion within burner block communication 22, thus raising the burner block wall temperature.

As shown in FIG. 3, in accordance with one embodiment of this invention, fuel conduit 15 comprises means for connecting to a fuel supply in the form of quick connect assembly 28. However, it will be apparent to those skilled in the art that other forms of connecting fuel conduit 15 to a fuel supply are equally suitable.

The process for combustion of a fuel and an oxidant mixture in accordance with one embodiment of this invention comprises introducing a fuel, preferable natural gas, into a communication in a burner block, said communication disposed between the hot face of the burner block, normally the face of the burner block exposed to the interior of a furnace, and a cold face of a burner block through a fuel conduit disposed concentrically within an oxidant conduit and having one end disposed within said burner block communication. Oxidant, preferably 100% oxygen, is introduced into the burner block communication through an annulus formed between the fuel conduit and the oxidant conduit. A portion of the fuel introduced into burner block communication 22 is partially cracked, forming cracked products comprising soot. The resulting cracked products together with the remaining portion of fuel are burned in a furnace to form a luminous flame.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A burner for combustion of a mixture of a fuel and oxygen, mountable on a burner block having a hot face, a cold face opposite said hot face and forming a communication having a circular cross-section between said hot face and said cold face, comprising:

an oxygen conduit;

a fuel conduit disposed concentrically within said oxygen conduit and forming an annulus between said fuel conduit and said oxygen conduit, one end of said fuel conduit extending into said burner block communication at a distance from said burner block hot face;

said fuel conduit having a fuel tip at said one end, said fuel tip having a converging internal diameter followed by a diverging internal diameter in a direction of said burner block hot face, thereby forming a fuel orifice between said converging and diverging diameters; and a ratio of said distance between said end of said fuel conduit and said burner block hot face to a diameter of said burner block communication being between about 0.5:1 to about 2.0:1.

2. A burner in accordance with claim 1, wherein said fuel tip is removable from said fuel conduit.

3. A burner in accordance with claim 1, wherein a ratio of a diameter of said fuel orifice to said diameter of said burner block communication is between about 0.1:1 to about 0.5:1.

4. A burner in accordance with claim 1, wherein a ratio of an outer diameter of said fuel conduit to said diameter of said burner block communication is between about 0.1:1 to about 0.5:1.

\* \* \* \* \*